(12) United States Patent
Hu et al.

(10) Patent No.: US 10,900,723 B2
(45) Date of Patent: Jan. 26, 2021

(54) COVER FOR CREATING CIRCULAR AIRFLOWS INSIDE AN ENCLOSURE

(71) Applicant: Pony AI Inc., Grand Cayman (KY)

(72) Inventors: Zhongnan Hu, Palo Alto, CA (US); Zuoteng Chen, San Jose, CA (US); Nengxiu Deng, Fremont, CA (US); Cheng Jin, Fremont, CA (US); Kai Chen, San Jose, CA (US); Yubo Zhang, Los Gatos, CA (US); Xiang Yu, Santa Clara, CA (US); Tiancheng Lou, Milpitas, CA (US); Jun Peng, Fremont, CA (US)

(73) Assignee: Pony AI Inc., Grand Cayman (KY)

( * ) Notice: Subject to any disclaimer, the term of this patent is extended or adjusted under 35 U.S.C. 154(b) by 100 days.

(21) Appl. No.: 16/133,130

(22) Filed: Sep. 17, 2018

(65) Prior Publication Data
US 2020/0088480 A1  Mar. 19, 2020

(51) Int. Cl.
| F28F 13/12 | (2006.01) |
| G01S 7/481 | (2006.01) |
| G01S 17/931 | (2020.01) |
| G01D 11/24 | (2006.01) |

(52) U.S. Cl.
CPC .......... *F28F 13/12* (2013.01); *G01S 7/4813* (2013.01); *G01S 17/931* (2020.01); *F28F 2250/08* (2013.01); *G01D 11/245* (2013.01)

(58) Field of Classification Search
CPC ..... F28F 13/12; F28F 2250/08; G01S 17/931; G01S 7/4813; G01D 11/245
USPC .......................................... 454/69, 184, 258
See application file for complete search history.

(56) References Cited

U.S. PATENT DOCUMENTS

| 4,643,268 A | 2/1987 | Jones et al. |
| 6,280,317 B1 | 8/2001 | Przilas et al. |
| 9,267,743 B2 | 2/2016 | Sugimoto et al. |
| 9,880,263 B2* | 1/2018 | Droz ..................... G01S 17/931 |
| 9,885,526 B2* | 2/2018 | Maranville ........... G01S 7/4813 |
| 10,017,245 B2 | 7/2018 | Geise et al. |
| 1,029,565 A1 | 5/2019 | Li et al. |

(Continued)

FOREIGN PATENT DOCUMENTS

WO   WO 2019/192055   10/2019

OTHER PUBLICATIONS

International Search Report and Written Opinion for PCT/US2019/051254 dated Nov. 19, 2019, 8 pages.

*Primary Examiner* — Steven B McAllister
*Assistant Examiner* — Michelle D Myrick
(74) *Attorney, Agent, or Firm* — Sheppard Mullin Richter & Hampton LLP

(57) ABSTRACT

A cover defining an outer contour of a sensor enclosure with at least three identifiable portions stacked along a vertical axis. A first portion having a circular domed shape. A second portion, disposed underneath the first portion and coupled to a base of the first portion, having a truncated cone shape. The second portion includes one or more protruding grooves arranged diagonally about the vertical axis and imprinted on an outer surface of the second portion. The one or more protruding grooves channel a portion of an inlet airflow drawn into a cavity of the cover into a circular airflow. A third portion, disposed underneath the second portion and coupled to a base of the second portion, having a truncated cone shape.

20 Claims, 9 Drawing Sheets

(56) References Cited

U.S. PATENT DOCUMENTS

| | | | |
|---|---|---|---|
| 10,338,198 B2 * | 7/2019 | Peters | G01S 17/931 |
| 10,359,303 B1 * | 7/2019 | Krishnan | G01D 11/245 |
| 2012/0272726 A1 * | 11/2012 | Cullen | G01W 1/14 |
| | | | 73/170.21 |
| 2014/0196446 A1 | 7/2014 | Holley | |
| 2019/0384313 A1 * | 12/2019 | Toth | B60R 11/04 |

* cited by examiner

COVER FOR CREATING CIRCULAR AIRFLOWS INSIDE AN ENCLOSURE

FIELD OF THE INVENTION

This disclosure relates to a cover for creating circular airflows inside an enclosure. More particularly, the present disclosure relates to a cover for creating circular airflows inside a sensor enclosure.

BACKGROUND

In general, an autonomous vehicle relies on myriad of information obtained from various sensors to determine operations to be taken next (e.g., turning, accelerating, breaking, etc.). Such sensors may include light detection and ranging sensors (LiDARs), cameras, and radars, to name some examples. Often, sensors are mounted exteriorly to an autonomous vehicle. Such a configuration exposes the sensors to harsh environmental conditions (e.g., large temperature swings, ultra violet radiation, oxidation, wind, etc.), and thereby may prematurely shorten a sensor's lifetime. Furthermore, mounting the sensors exteriorly to the autonomous vehicle can subject the sensors to an increased risk of impact or damage from road debris. To alleviate these and other problems, a sensor enclosure may be utilized such that sensors can be encased in the sensor enclosure. Such a sensor enclosure may offer additional protection against environmental elements and road debris while still allowing the sensors to function or operate. However, encasing sensors in a sensor enclosure can create operational challenges. For example, while operating in summer, internal temperature of the sensor enclosure may rise beyond operational temperature of the sensors. This can lead to sensor malfunction and can render the autonomous vehicle inoperable. In another example, while operating in winter, moistures inside the sensor enclosure can condensate or fog up, thus preventing the sensors from gathering critical road information. These shortfalls are addressed by the present inventions.

SUMMARY

Described herein are a cover for creating circular airflows inside a sensor enclosure, the sensor enclosure, and a method for operating the sensor enclosure.

In one embodiment, the present disclosure describes a cover defining an outer contour of a sensor enclosure with at least three identifiable portions stacked along a vertical axis. A first portion having a circular domed shape. A second portion, disposed underneath the first portion and coupled to a base of the first portion, having a truncated cone shape. The second portion includes one or more protruding grooves arranged diagonally about the vertical axis and imprinted on an outer surface of the second portion. The one or more protruding grooves channel a portion of an inlet airflow drawn into a cavity of the cover into a circular airflow. A third portion, disposed underneath the second portion and coupled to a base of the second portion, having a truncated cone shape.

In some embodiments, the first portion has a first diameter measured at the base of the first portion and a first angle measured from the base of the first portion to an outer surface of the first portion. The second portion has a second diameter measured at the base of the second portion and a second angle measured from the base of the second portion to the outer surface of the second portion. The third portion has a third diameter measured at a base of the third portion and a third angle measured from the base of the third portion to an outer surface of the third portion.

In some embodiments, the first diameter is smaller than the second diameter and the second diameter is smaller than the third diameter.

In some embodiments, the first angle is larger than the second angle and the second angle is smaller than the third angle.

In some embodiments, the first angle ranges from zero to ninety degrees, the second angle ranges from zero and ninety degrees, and the third angle ranges from zero to ninety degrees.

In some embodiments, the one or more protruding grooves are at least one of linear, substantially linear, curved, or tapered.

In some embodiments, the cover is made of material transparent to wavelengths of light receptive to one or more sensors inside the sensor enclosure.

In some embodiments, the cover is made of at least one of acrylic glass, strengthened glass, or safety glass.

In some embodiments, the cover is selectively coated with a thin-film neutral filter to alter a transmittance to light through the cover.

In some embodiments, the cover is selectively coated with a thin-film graduated neutral filter to alter a transmittance to light through the cover along an axis.

In some embodiments, the inlet airflow is a vertical airflow along the vertical axis of the cover.

These and other features of the apparatus disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the inventions.

BRIEF DESCRIPTION OF THE DRAWINGS

Certain features of various embodiments of the present inventions are set forth with particularity in the appended claims. A better understanding of the features and advantages of the inventions will be obtained by reference to the following detailed description that sets forth illustrative embodiments, in which the principles of the invention are utilized, and the accompanying drawings of which:

Figure 1A:
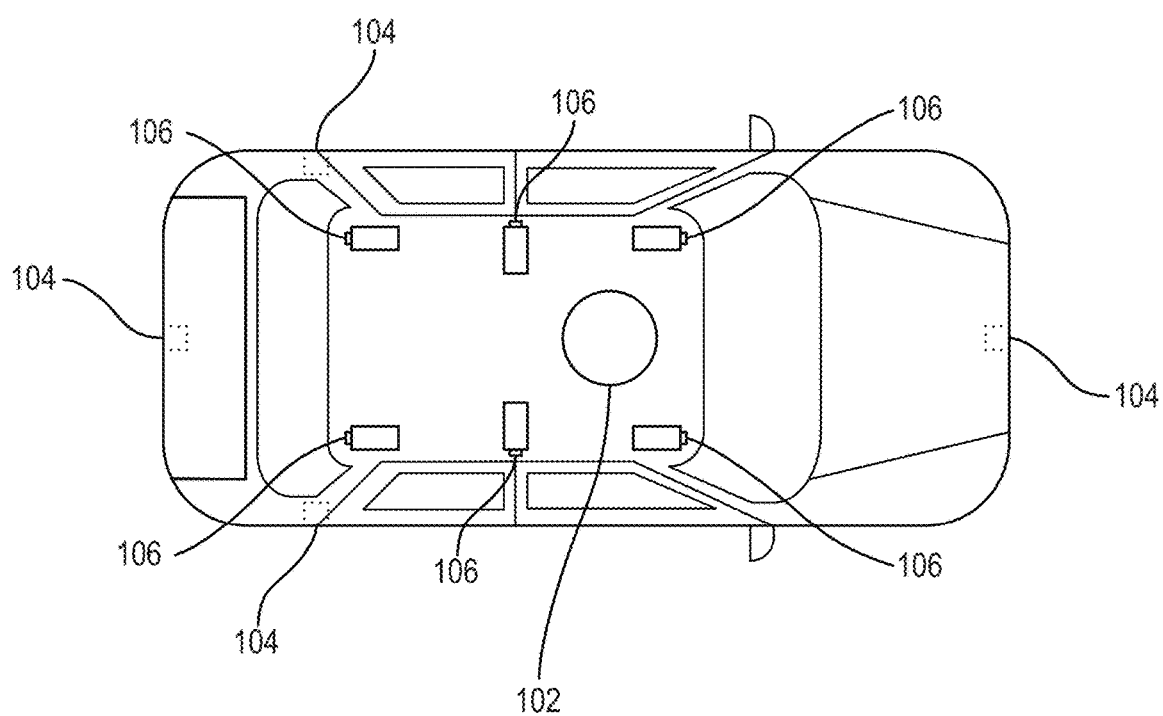
FIG. 1A illustrates an example autonomous vehicle, according to an embodiment of the present disclosure.

The figures depict various embodiments of the disclosed apparatus for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

An autonomous vehicle is equipped with complex sensors, data acquisition systems, actuation systems, and computing systems to enable the autonomous vehicle to operate without human involvement. These sensors can include light detection and ranging sensors (LiDARs), cameras, and radars, to name some examples. Often, the sensors are mounted exteriorly to the autonomous vehicle. Such a configuration is not ideal because mounting the sensors exteriorly expose the sensors to harsh environmental conditions (e.g., large temperature swings, ultra violet radiation, oxidation, etc.). These harsh conditions can prematurely shorten a sensor's lifetime. Furthermore, this configuration subjects the sensors to an increased risk of impact or damage from road debris. It is therefore desirable to encase the sensors in a sensor enclosure that provides an additional protection against environmental conditions, as well as, potential impacts from road debris.

Although the sensor enclosure can provide additional protection for the sensors, the sensor enclosure may also create operational challenges. For example, if not ventilated, internal temperature of the sensor enclosure may become hot during summer months. This temperature may cause thermal stress to internal components of the sensors (e.g., semiconductors, microprocessors, focal planes, etc.). This stress may introduce defects or latent defects that may cause the sensors to fail prematurely and without notice. Furthermore, some sensors may contain protection circuitry such that when temperature reaches a certain point, the protection circuitry activates and prevents these sensors from operation. Under such a scenario, the autonomous vehicle, for which these sensors are onboard, will be rendered inoperable. The sensor enclosure may also pose operational difficulties during winter months. For example, during winter, moistures may condensate or fog up on internal surfaces of the sensor enclosure. This opaque layer prevents the sensors from gathering road-related information. For instance, the condensation on the internal surfaces of the sensor enclosure may prevent cameras inside the sensor enclosure from gathering image data. Similarly, the condensation on the internal surfaces of the sensor enclosure may prevent a LiDAR from scanning an environment.

A claimed apparatus overcomes problems specifically discussed above. In various embodiments, a sensor enclosure comprises a cover and a structure. The cover defines an outer contour of the sensor enclosure with at least three identifiable portions stacked along a vertical axis. The cover comprises a first portion having a circular domed shape. A second portion having a truncated cone shape that is disposed underneath the first portion and coupled to a base of the first portion. The second portion includes one or more protruding grooves arranged diagonally about the vertical axis on an outer surface of the second portion. The one or more protruding grooves channel an inlet airflow drawn into a cavity of the sensor enclosure into a circular airflow. The circular airflow can evenly, uniformly, and homogeneous cool sensors encased in the sensor enclosure. A third portion having a truncated cone shape can be disposed underneath the second portion and coupled to a base of the second portion. The structure provides various mounting surfaces for the sensors encased in the sensor enclosure. Further details of the cover, the structure, and the sensor enclosure will be discussed herein.

FIG. 1A illustrates an example autonomous vehicle 100, according to an embodiment of the present disclosure. An autonomous vehicle 100 generally refers to a category of vehicles that are capable of sensing and driving in an environment by itself. The autonomous vehicle 100 can include myriad of sensors (e.g., LiDARs, cameras, radars, etc.) to detect and identify objects in an environment. Such objects may include, but not limited to, pedestrians, road signs, traffic lights, and/or other vehicles, for example. The autonomous vehicle 100 can also include myriad of actuators to propel the autonomous vehicle 100 navigate around the environment. Such actuators may include, for example, any suitable electro-mechanical devices or systems to control a throttle response, a braking action, a steering action, etc. In some embodiments, the autonomous vehicle 100 can recognize, interpret, and comprehend road signs (e.g., speed limit, school zone, construction zone, etc.) and traffic lights (e.g., red light, yellow light, green light, flashing red light, etc.). For example, the autonomous vehicle 100 can adjust vehicle speed based on speed limit signs posted on roadways. In some embodiments, the autonomous vehicle 100 can determine and adjust a speed at which the autonomous vehicle 100 is traveling in relation to other objects in the environment. For example, the autonomous vehicle 100 can maintain a constant, safe distance from a vehicle ahead (e.g., adaptive cruise control). In this example, the autonomous vehicle 100 maintains this safe distance by constantly adjusting its vehicle speed to that of the vehicle ahead.

In various embodiments, the autonomous vehicle 100 may navigate through roads, streets, and/or terrain with limited or no human input. The word "vehicle" or "vehicles" as used in this paper includes vehicles that travel on ground (e.g., cars, trucks, bus, etc.), but may also include vehicles that travel in air (e.g., drones, airplanes, helicopters, etc.), vehicles that travel on water (e.g., boats, submarines, etc.). Further, "vehicle" or "vehicles" discussed in this paper may or may not accommodate one or more passengers therein.

In general, the autonomous vehicle 100 can effectuate any control to itself that a human driver can on a conventional vehicle. For example, the autonomous vehicle 100 can accelerate, brake, turn left or right, or drive in a reverse direction just as a human driver can on a conventional vehicle. The autonomous vehicle 100 can also sense environmental conditions, gauge spatial relationships (e.g., distances between objects and itself), detect and analyze road signs just as the human driver. Moreover, the autonomous vehicle 100 can perform more complex operations, such as parallel parking, parking in a crowded parking lot, collision avoidance, etc., without any human input.

In various embodiments, the autonomous vehicle 100 may include one or more sensors. As used herein, the one or more sensors may include laser scanning systems (e.g., LiDARs) 102, radar systems 104, camera systems 106, and/or the like. The one or more sensors allow the autonomous vehicle 100 to sense an environment around the autonomous vehicle 100. For example, the LiDARs 102 can generate a three dimensional map of the environment. The LiDARs 102 can also detect objects in the environment. In another example, the radar systems 104 can determine distances and speeds of objects around the autonomous vehicle 100. In another example, the camera systems 106 can capture and process image data to detect and identify objects, such as road signs, as well as deciphering content of the objects, such as speed limit posted on the road signs.

In the example of FIG. 1A, the autonomous vehicle 100 is shown with a LiDAR 102 coupled to a roof or a top of the autonomous vehicle 100. The LiDAR 102 can be configured to generate three dimensional maps of an environment and detect objects in the environment. In the example of FIG. 1A, the autonomous vehicle 100 is shown with four radar systems 104. Two radar systems are coupled to a front-side and a back-side of the autonomous vehicle 100, and two radar systems are coupled to a right-side and a left-side of the autonomous vehicle 100. In some embodiments, the front-side and the back-side radar systems can be configured for adaptive cruise control and/or accident avoidance. For example, the front-side radar system can be used by the autonomous vehicle 100 to maintain a safe distance from a vehicle ahead of the autonomous vehicle 100. In another example, if the vehicle ahead experiences a suddenly reduction in speed, the autonomous vehicle 100 can detect this sudden change in motion and adjust its vehicle speed accordingly. In some embodiments, the right-side and the left-side radar systems can be configured for blind-spot detection. In the example of FIG. 1A, the autonomous vehicle 100 is shown with six camera systems 106. Two camera systems are coupled to the front-side of the autonomous vehicle 100, two camera systems are coupled to the back-side of the autonomous vehicle 100, and two camera systems are couple to the right-side and the left-side of the autonomous vehicle 100. In some embodiments, the front-side and the back-side camera systems can be configured to detect, identify, and decipher objects, such as cars, pedestrian, road signs, in the front and the back of the autonomous vehicle 100. For example, the front-side camera systems can be utilized by the autonomous vehicle 100 to determine speed limits. In some embodiments, the right-side and the left-side camera systems can be configured to detect objects, such as lane markers. For example, side camera systems can be used by the autonomous vehicle 100 to ensure that the autonomous vehicle 100 drives within its lane.

Figure 1B:
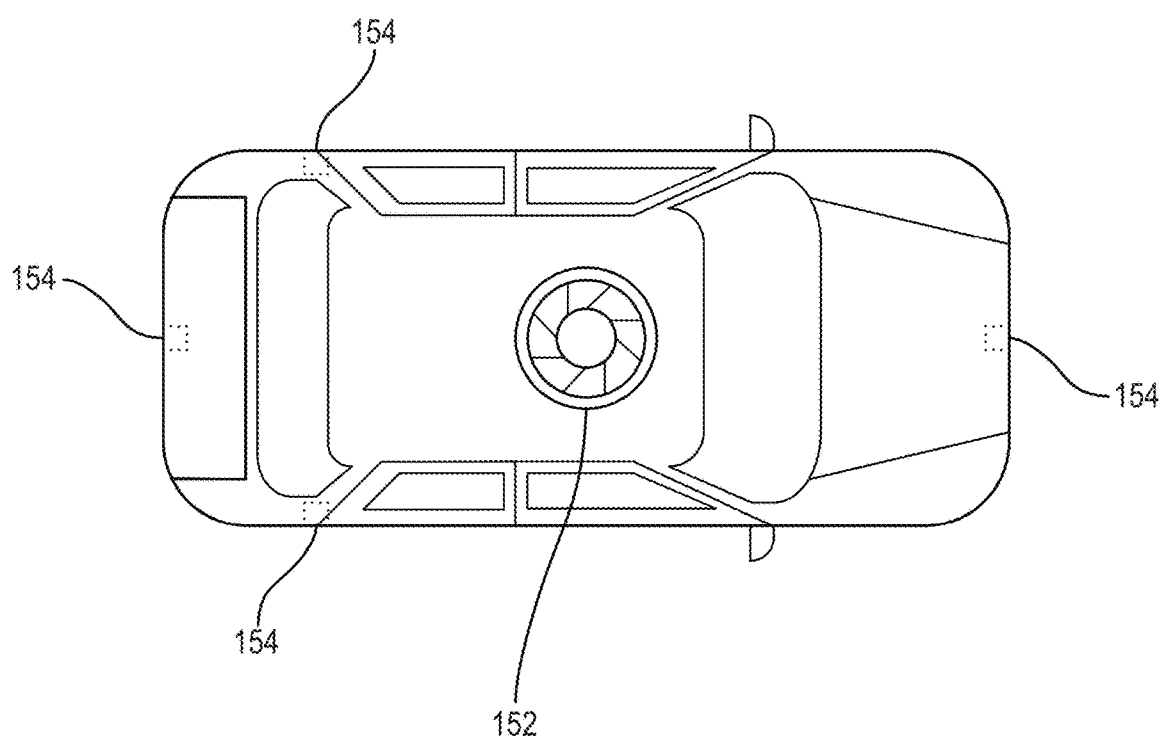
FIG. 1B illustrates an example autonomous vehicle, according to an embodiment of the present disclosure.

FIG. 1B illustrates an example autonomous vehicle 150, according to an embodiment of the present disclosure. In the example of FIG. 1B, the autonomous vehicle 150 is shown with a sensor enclosure 152 and four radar systems 154. The sensor enclosure 152 can include a LiDAR and one or more camera systems. As discussed, the sensor enclosure 152 can provide an additional protection for the LiDAR and the one or more camera systems against various environmental conditions while still allowing wavelengths of light receptive to the LiDAR and the one or more camera systems to enter. In general, the LiDAR and the one or more camera systems of the sensor enclosure 152 and the four radar systems work exactly same as the LiDAR, camera systems, and radar systems discussed with respect with FIG. 1A. The sensor enclosure 152 will be discussed in further detail with references to FIGS. 2A and 2B.

Figure 2A:
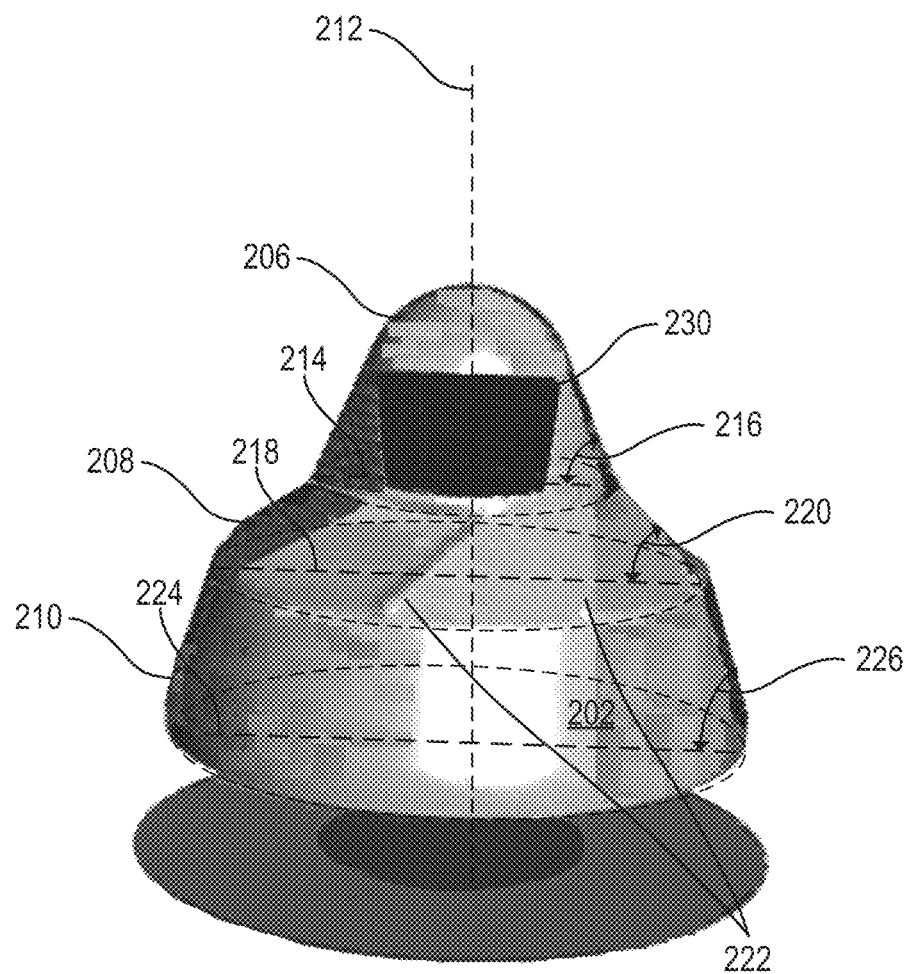
FIGS. 2A-2B illustrate an example sensor enclosure, according to an embodiment of the present disclosure.
Figure 2B:
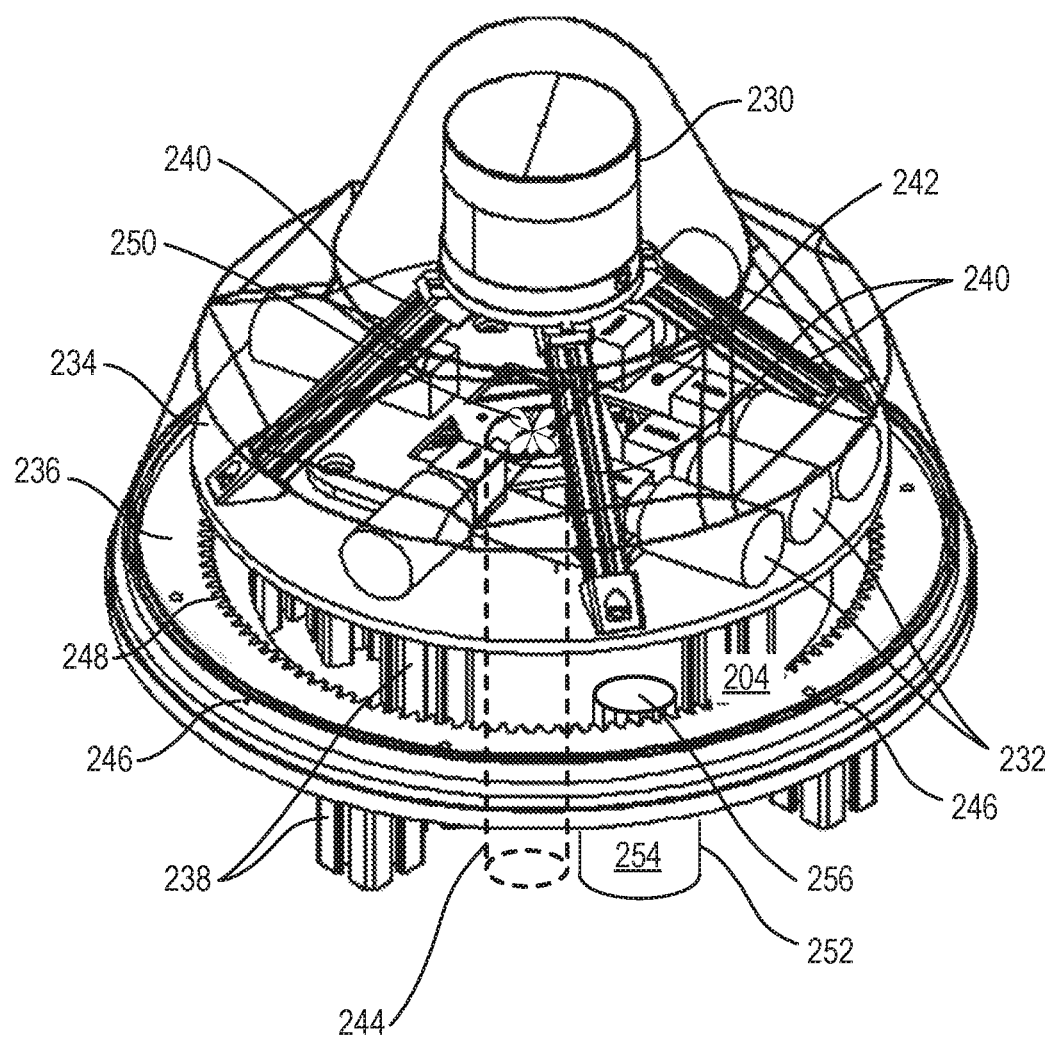

FIGS. 2A and 2B illustrate an example sensor enclosure 200, according to an embodiment of the present disclosure. In some embodiments, the sensor enclosure 152 of FIG. 1B can be implemented as the sensor enclosure 200. FIG. 2A illustrates the sensor enclosure 200 undergoing wind tunnel (or aerodynamic) testing. In various embodiments, the sensor enclosure 200 can include a cover 202 and a structure 204. Sensors of an autonomous vehicle can be mounted to the structure 204 and be encased by the cover 202. In some embodiments, the cover 202 can be operatively coupled to the structure 204. For example, the cover 202 is detachable or removable from the structure 204 to allow easy access to the sensors. In some embodiments, the cover 202 can be rotationally fixed (e.g., unrotatable) relative to the structure 204. In this embodiment, an inlet airflow drawn into a cavity of the sensor enclosure 200 can be passively circularized by protruding grooves 222 imprinted on the cover 202. Through this circular airflow, sensors inside the sensor enclosure 200 can be uniformly, evenly, or homogeneously cooled. In some embodiments, the cover 202 can rotate around the structure 204 about a vertical axis 212. In this embodiment, the rotation of the cover, in conjunction with the protruding grooves 222, can create a circular airflow inside the cavity of the sensor enclosure 200. In some embodiments, the circular airflow can demist or defog the cover 202 when weather conditions cause the cover 202 to fog up or condensate. The circularized airflow will be discussed in further detail with references to FIGS. 3A-3B.

The cover 202 defines an outer contour, shape, or silhouette of the sensor enclosure 200. In general, because the sensor enclosure 200 is mounted exteriorly to the autonomous vehicle, it is desirable for the cover 202 to have a profile that has low wind resistance or coefficient of drag in order to minimize negative impacts to fuel economy. For example, a cover 202 with an angular profile is more desirable than a square profile because the angular profile has a lower wind resistance than the square profile. In some embodiments, the cover 202 can have three identifiable or visually distinct portions (e.g., sections, regions, etc.): a first portion 206, a second portion 208, and a third portion 210. The three identifiable portions are stacked on top of one another along the vertical axis 212. For example, the first portion 206 is disposed on top of the second portion 208 and the second portion 208 is disposed on top of the third portion 210. As shown in FIG. 2A, the first portion 206 generally has a circular dome shape. The first portion 206 has a first diameter 214 and a first angle 216. The first diameter 214 is measured at a base of the first portion 206 and the first angle 216 is measured from the base of the first portion 206 to an outer surface of the first portion 206. The first angle 216 can vary anywhere from zero to ninety degrees. In the example of FIG. 2A, the first angle 216 is shown to have an angle of approximately sixty five degrees. In relation to the sensor enclosure 200, the first portion 210 may encase a light detecting and ranging sensor 230 (LiDAR) of the autonomous vehicle.

As shown in FIG. 2A, the second portion 208 is disposed underneath the first portion 206, in which the base of the first portion 206 is coupled to a top of the second portion 208. The second portion 208 generally has a truncated cone shape with a second diameter 218 and a second angle 220. The second diameter 218 is measured at a base on the second portion 208 and the second angle 220 is measured from the base of the second portion 208 to an outer surface of the second portion 208. The second angle 220 can vary anywhere from zero to ninety degrees. In the example of FIG. 2A, the second angle 218 is shown to have an angle of approximately forty degrees. In general, the second portion 208 is larger or wider than the first portion 208. In other words, the second diameter 218 is larger than the first diameter 214. In some embodiments, the outer surface of the second portion 208 can have protruding grooves 222. The protruding grooves 222 are diagonally arranged about the vertical axis 212. In general, the protruding grooves 222 can have a convex appearance when viewed from an external vantage point. In one implementation, the protruding groove 222 can be linear (e.g., a straight line) or substantially linear. In another implementation, the protruding grooves 222 can be slightly curved. In yet another implementation, the protruding grooves 222 can be tapered (e.g., one end of a protruding groove is wider than the other end). Many variations are possible. As discussed, the protruding grooves 222 can circularize an inlet airflow. Details of the circularization will be discussed with references to FIGS. 3A-3B.

As shown in FIG. 2A, the third portion 210 is disposed underneath the second portion 208, in which the base of the second portion 208 is coupled to a top of the third portion 210. The third portion 210 can have a truncated cone shape with a third diameter 224 and a third angle 226. The third diameter 224 is measured at a base on the third portion 210 and the third angle 226 is measured from the base of the third portion 210 to an outer surface of the third portion 210. The third angle 226 can vary anywhere from zero to ninety degrees. In the example of FIG. 2A, the third angle 226 is shown to have an angle of approximately eighty degrees. In general, the third portion 210 is larger or wider than the second portion 208. In other words, the third diameter 224 is larger than the second diameter 218. In relation to the sensor enclosure 200, the third portion 210 encases a plurality of cameras 232 of the autonomous vehicle.

Although the foregoing paragraphs describe the cover 202 as having three identifiable portions, it is of note here that the cover 202 is a single continuous entity with no seams or gaps that divide the cover 202 in to the portions as discussed. The nomenclature of using "portion" or "portions" to describe the various visually distinct features of the cover 202 is for ease of discussion. The word "portion" or "portions" used in any relation or in any context to the cover 202 shall not be construed as having separate distinct entities or qualities.

In general, the cover 202 can be made from any suitable material that allows the sensors of the sensor enclosure 200 to operate while shielding the sensors from environmental elements (e.g., rain, snow, moisture, wind, dust, radiation, oxidation, etc.). Further, any material used to fabricate the cover 202 must be transparent to wavelengths of light (or electro-magnetic waves) receptive to the LiDAR 230 and the plurality of cameras 232. For example, for the LiDAR 230 to properly operate, the cover 202 must allow laser pulses emitted from the LiDAR 230 to pass through the cover 202 to reach a target and then reflect back through the cover 202 and back to the LiDAR 230. Similarly, for the plurality of cameras 232 to properly operate, the cover 202 must allow entry of visible light. In addition to being transparent to wavelengths of light, any suitable material must also be able to withstand potential impacts from roadside debris. In an implementation, the cover 202 can be made from acrylic glass (e.g., Cylux, Plexiglas, Acrylite, Lucite, Perspex, etc.). In another implementation, the cover 202 can be made from strengthen glass (e.g., Coring® Gorilla® glass). In yet another implementation, the cover 202 can be made from laminated safety glass held in place by layers of polyvinyl butyral (PVB), ethylene-vinyl acetate (EVA), or other similar chemical compounds. Many implementations are possible and contemplated.

In some embodiments, the cover 202 can be tinted with a thin-film neural filter to reduce transmittance to light entering the cover 202. For example, in an embodiment, the third portion 210 of the cover 202 can be selectively tinted with the thin-film neutral filter to reduce intensity of visible light seen by the plurality of cameras 232. In this example, transmittance to laser pulses emitted from the LiDAR 230 is not affected by the tint because only the third portion 210 is tinted. In another embodiment, the third portion 210 can be tinted with a thin-film graduated neural filter in which the transmittance to visible light varies along an axis. In yet another embodiment, the cover 202 can be completely treated or coated with a reflective coating such that inner of the sensor enclosure 200 is not visible from an outside vantage point while still being transparent to wavelengths of light receptive to the LiDAR 230 and the plurality of cameras 232. Many variations, such as adding a polarization layer or an anti-reflective layer, are possible and contemplated.

As shown in FIG. 2B, in various embodiments, the structure 204 provides a mechanical framework for the sensor enclosure 200. The structure 204 can provide surfaces for which the LiDAR 230 and the plurality of cameras 232 can be mounted, anchored, installed, or secured inside the sensor enclosure 200. In some embodiments, the structure 204 comprises a frame 234, a ring 236, and anchoring posts 238. The frame 234 provides mechanical support for the LiDAR 230 and the plurality of cameras 232. The ring 236 provides mounting points for the cover 202 such that the cover 202 encases the structure 204. The anchoring posts 238 provide mechanical couplings to secure or mount the sensor enclosure 200 to the autonomous vehicle.

In some embodiments, the frame 234 can have two base plates held in place by structs 240. As shown in FIG. 2B, an upper base plate of the frame 234 can provide a surface for the LiDAR 230 to be mounted, while a lower base plate of the frame 234 can provide a surface for the plurality of cameras 232 to be mounted. In general, any number of LiDARs and cameras can be mounted to the frame 234. The frame 234 is not limited to having one LiDAR and six cameras as depicted in FIG. 2B. For example, in an embodiment, the frame 234 can have more than two base plates held in place by the structs 240. In this example, the frame 234 may have three base plates with upper two base plates reserved for two LiDARs and a lower base plate for cameras. In another embodiment, the lower base plate can have more than six cameras. For instance, there can be four cameras pointed in a forward direction of an autonomous vehicle, two cameras pointed to in a right and a left direction of the autonomous vehicle, and three cameras pointed in a reverse direction of the autonomous vehicle. Many variations are possible.

In FIG. 2B, the frame 234 is additionally shown to include a temperature sensor 242, a fan 250, and an air duct 244. The temperature sensor 242 can be configured to measure internal temperature of the sensor enclosure 200. In general, the temperature sensor 242 can be placed anywhere on the frame 234 that is most representative of the internal temperature. In a typical implementation, the temperature sensor 242 is placed in a region in which heat generated by the LiDAR 230 and the plurality of cameras 232 are most localized. In the example of FIG. 2B, the temperature sensor 242 is placed on the lower base plate of the frame 234, right behind the three front cameras. The fan 250 can be configured to draw an inlet airflow from an external source. The fan 250, in various implementations, works in conjunction with the temperature sensor 242 to maintain a steady temperature inside the cavity of the sensor enclosure 200. The fan 250 can vary its fan speed depending on the internal temperature. For example, when the internal temperature is high, as measured by the temperature sensor 242, the fan 250 may increase its speed to draw additional airflow to lower the internal temperature. In the example of FIG. 2B, the fan 250 is generally located centrally on the lower base plate of the frame 234 where the air duct 244 ends. The air duct 244 is a physical conduit that convey or directs the inlet airflow, created by the fan, through which cooling air can be drawn from various external sources. In one embodiment, the air duct 244 may be connected to a passenger cabin of the autonomous vehicle. In this embodiment, the cooling air is drawn from the passenger cabin of the autonomous vehicle.

In another embodiment, the air duct 246 may be connected to a separate air conditioning unit that provides separate cooling air apart from the passenger cabin of the autonomous vehicle. In yet another embodiment, the air duct 246 may be connected to an external opening or orifice to draw outside ambient air. In some embodiments, the air conditioned air from the passenger cabin or the separate air conditioning unit can be used to demist or defog the cover 202.

In some embodiments, the frame 234 can also include a powertrain 252. The powertrain 252 is an electric motor 254 coupled to a drivetrain 256 comprising one or more gears. The powertrain 252 can rotate the ring 236 clockwise or counter-clockwise. In various embodiments, the electric motor 254 can be a direct current brush or brushless motor, or an alternate current synchronous or asynchronous motor. Many variations are possible. In various embodiments, the one or more gears of the drivetrain 256 can be configured to have various gear ratios optimized over torque delivery and rotational speed.

In general, the frame 234 can be made from any suitable materials that can withstand extreme temperature swings and weather various environmental conditions (e.g., rain, snow, corrosion, oxidation, etc.). The frame 234 can be fabricated using various metal alloys (e.g., aluminum alloys, steel alloys, etc.). The frame 234 can also be fabricated using three dimensional printers with thermoplastics (e.g., polylactic acid, acrylonitrile butadiene styrene, polyamide, high impact polystyrene, thermoplastic elastomer, etc.). Similarly, the air duct 426 can be made from rigid materials (e.g., hard plastics, polyurethane, metal alloys, etc.) or semi-rigid materials (e.g., rubber, silicone, etc.). Many variations are possible.

The ring 236 can provide mounting points for the cover 202 to encase the structure 204. The ring 236 is disposed peripherally to the frame 234. In the example of FIG. 2B, the ring 236 has an outer portion that includes attachment points 246 through which the cover 202 can be attached and secured. In some embodiments, the ring 236 has an inner portion that comprises gear teeth 248 (or cogs) such that when the gear teeth 248 is driven by the powertrain 252 of the frame 234, the ring 236 and the cover 202 rotate as a unit as a result. As discussed, in some embodiments, the rotation of the cover 202, can cause the inlet airflow drawn into the cavity of the sensor enclosure 200 to circularize. This circular airflow will be discussed in more detail with references to FIGS. 3A-3B.

Similar to the frame 234, the ring 236 can be made from any suitable material that can withstand extreme temperature swings and weather various environmental conditions. However, in some implementations, the suitable material for the ring 236 can be somewhat more durable than the material used for the frame 234. This is because the gear teeth 248 of the ring 236 are subject to more wear and tear from being coupled to the powertrain of the frame 234. In general, the ring 236 can be fabricated using various metal alloys (e.g., carbon steel, alloy steel, etc.). The ring 236 can also be fabricated using three dimensional printers with thermoplastics (e.g., polylactic acid, acrylonitrile butadiene styrene, polyamide, high impact polystyrene, thermoplastic elastomer, etc.).

The anchoring posts 238 can provide mechanical couplings to secure or mount the sensor enclosure 200 to the autonomous vehicle. The anchoring posts are disposed beneath the frame 234 and the ring 236. In general, any number of anchoring posts 238 may be used. In the example of FIG. 2B, the sensor enclosure 200 is shown with eight anchoring posts: four anchoring posts to secure the frame 234 to the autonomous vehicle and four anchoring posts to secure the ring 236 to the autonomous vehicle. Similar to the frame 234 and the ring 236, the anchoring posts 238 can be made from any suitable materials and fabricated using metal alloys (e.g., carbon steel, alloy steel, etc.) or three dimensionally printed with thermoplastics (e.g., polylactic acid, acrylonitrile butadiene styrene, polyamide, high impact polystyrene, thermoplastic elastomer, etc.).

Figure 3A:
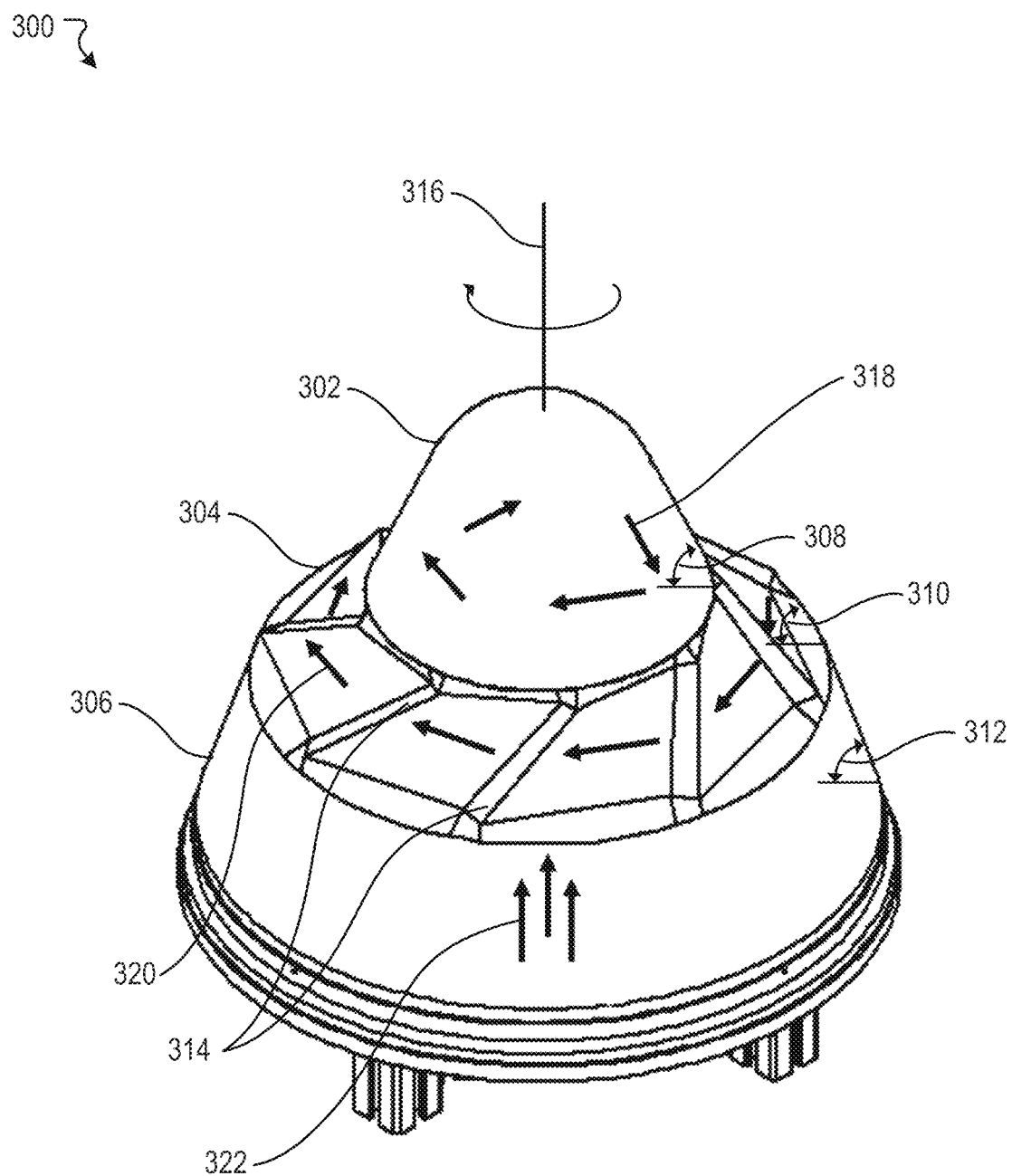
FIGS. 3A-3B illustrate an example cover, according to an embodiment of the present disclosure.
Figure 3B:
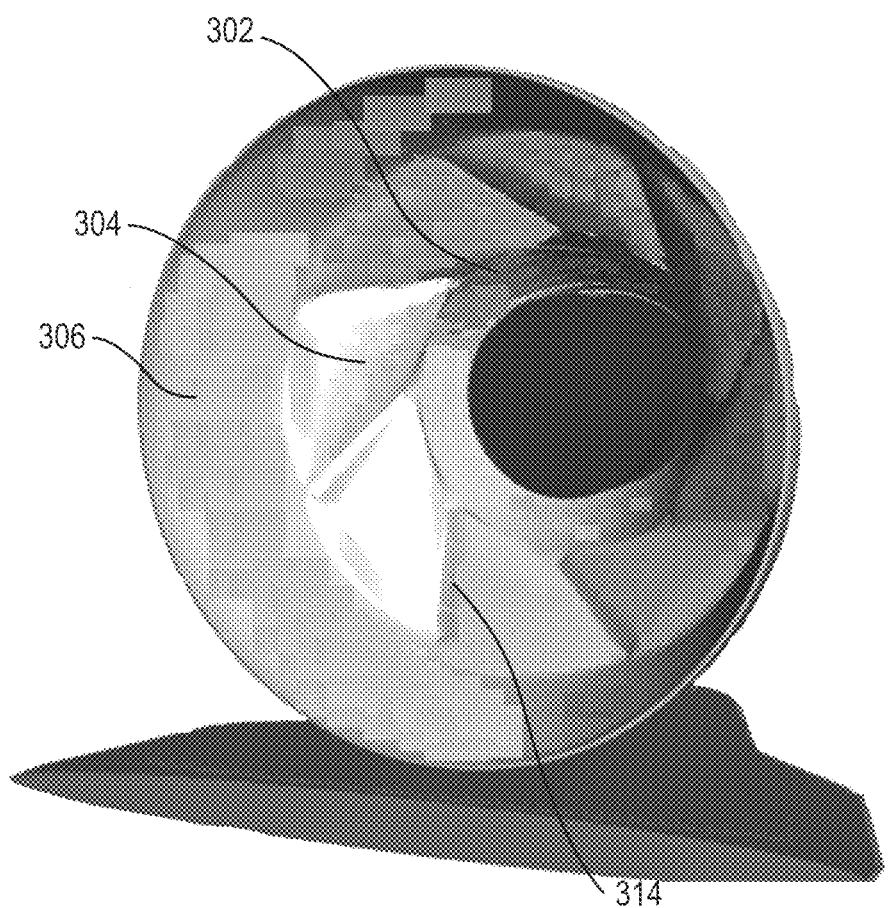

FIGS. 3A-3B illustrate an example cover 300, according to an embodiment of the present disclosure. In some embodiments, the cover 202 of FIG. 2A can be implemented as the cover 300. Similar to the cover 202 of FIG. 2A, the cover 300 can have three identifiable or visually distinct portions (e.g., sections, regions, etc.): a first portion 302, a second portion 304, and a third portion 306. As discussed previously with respect to FIG. 2A, the first portion 302 can have a circular dome shape with a first angle 308 less than ninety degrees. Similarly, the second portion 304 can have a truncated cone shape with a second angle 310 less than the first angle, and the third portion 306 can have a truncated cone shape with a third angle 312 larger than the second angle 310 but less than ninety degrees. In general, the third portion 306 is larger, wider, or has a larger diameter than the second portion 304, and the second portion 304 is larger, wider, or has a larger diameter than the first portion 302.

In various embodiments, the cover 300 can generate or create two circularized airflows based on an inlet airflow 322. As shown in FIG. 3A, the inlet airflow 322 can be drawn into a cavity of the cover 300 by a fan (e.g., the fan of FIG. 2B). This inlet airflow 322 is initially drawn to the first portion 302 of the cover 300 at which a portion of the inlet airflow 322 is circularized into a first circular airflow 318. This circularization is due to the circular dome shape of the first portion 302. The first circular airflow 318 can uniformly cool a LiDAR (e.g., the LiDAR 230 of FIG. 2B) encased by the cover 300. The portion of the inlet airflow 322 not circularized into the first circular airflow 318 can flow downwards to the second portion 304 through protruding grooves 314. The protruding grooves 314 are diagonally arranged about a vertical axis 316. The downward airflow is diagonally channeled through the protruding grooves 314 such that the portion of the inlet airflow 322 not circularized by the first portion 302 becomes circularized, for a second time, into a second circular airflow 320. The second circular airflow 320 can uniformly cool one or more cameras (e.g., the plurality of cameras 232 of FIG. 2B) encased by the cover 300. In general, the protruding grooves 314 can be any shape, form, or motif as long as a circular airflow can be created inside the cavity. For example, referring to FIG. 3B, the protruding groove 314 a concave appearance when viewed from a vantage point looking into the cavity. The protruding groove 314 can be linear, substantially linear, curved, or in some cases, tapered with one end of the protruding groove wider than the other end. In some embodiments, the inlet airflow 322 can be air conditioned. The air conditioned air, through the two circularized airflows, can defog or demist the cover 300. For example, the inlet airflow 322 can be diverted from a passenger cabin of a vehicle where the passenger cabin is air conditioned. In another example, the inlet airflow 322 can be diverted from an output of an independent air conditioning unit. Many variations are possible.

Now referring back to FIG. 3A, in some embodiments, the cover 300 can rotate about the vertical axis 316. For example, a powertrain (e.g., the powertrain of frame 234 in FIG. 2B) can be configured to rotate a ring (e.g., the ring 236 of FIG. 2B) to which the cover 300 is coupled. When the cover 300 is rotated by the powertrain, the protruding grooves 314 can create the second circular airflow 320 by actively channeling (or spinning) the portion of the inlet airflow 322 not circularized into the first circular airflow 318 through the protruding grooves 314. In general, the faster the cover 300 rotates, the faster the second circular airflow 320 circulates. The second circular airflow 320 can uniformly, evenly, or homogeneously distribute a portion of the inlet airflow 322 to cool sensors encased by the cover 300 (e.g., the plurality of cameras 232 in FIG. 2B). One benefit to such circular airflows is to uniformly whisk away heat dissipated from the sensors through convective radiation.

Figure 4:
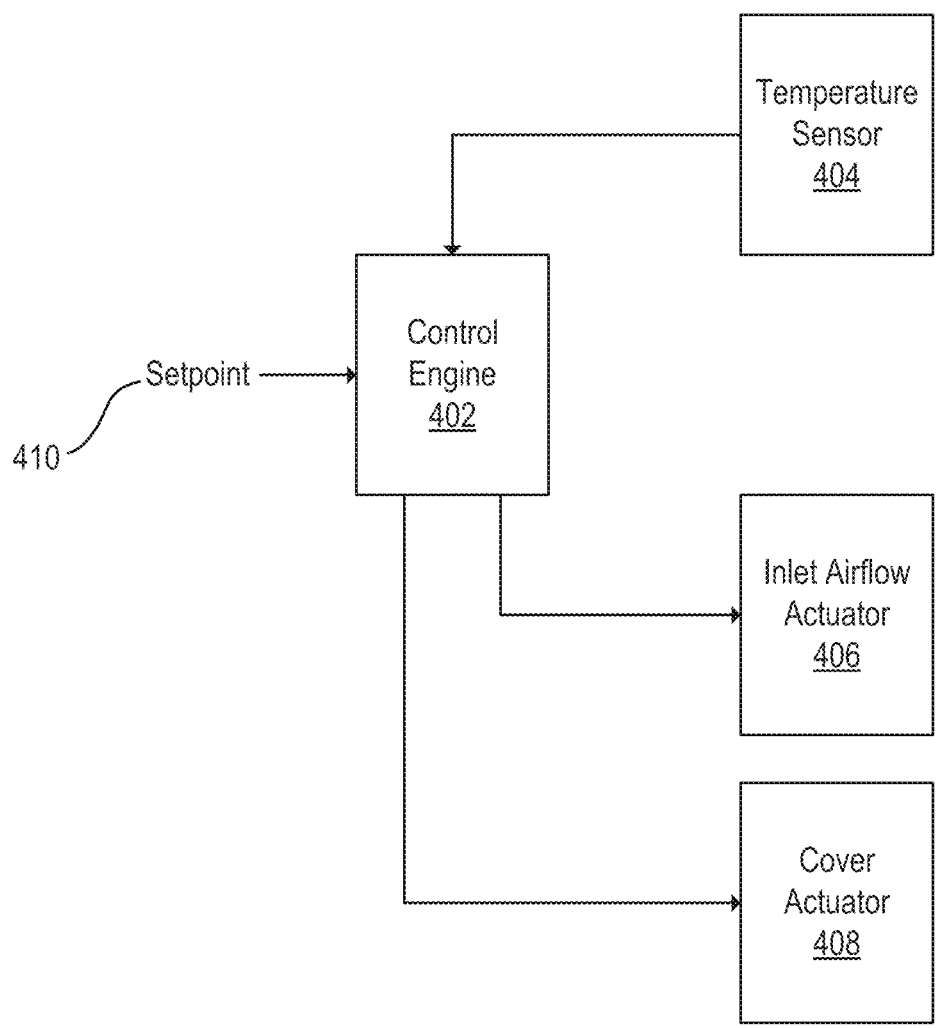
FIG. 4 illustrates an example control diagram, according to an embodiment of the present disclosure.

FIG. 4 illustrate an example control diagram 400, according to an embodiment of the present disclosure. In some embodiments, the control diagram 400 can include a control engine 402, a temperature sensor 404, an inlet airflow actuator 406, a cover actuator 408, and a setpoint 410. The control engine 402 can be configured to control speed of an inlet airflow (e.g., the inlet airflow 322 of FIG. 3A) by controlling the inlet airflow actuator 406 (e.g., the fan of FIG. 2B). The control engine 402 can also be configured to control speed at which the a cover (e.g., the cover 202 of FIG. 2A or the cover 300 of FIGS. 3A-3B) of a sensor enclosure (e.g., the sensor enclosure 200 of FIGS. 2A and 2B) rotates through the cover actuator 408 (e.g., the powertrain of the frame 234 of FIG. 2B). In various embodiments, the control engine 402 can receive temperature readings from the temperature sensor 404 (e.g., the temperature sensor 242 of FIG. 2B) at a predetermined timeframe or at a certain sampling rate. For example, the control engine 402 can receive temperature readings from the temperature sensor 404 every second, every thirty seconds, every minute, every five minutes, etc. The control engine 402, in various implementations, may compare this temperature reading with the setpoint 410 set by a computing system. Based on this comparison, the control engine 402 directs either the inlet airflow actuator 406 or the cover actuator 408, or both, to increase or decrease the speed of the actuation to keep temperature inside a cavity of the sensor enclosure within some tolerance of the setpoint 410. In general, the control engine 402 can be implemented with any suitable control algorithms or controllers. For example, in an embodiment, the control engine 402 can be implemented as a feed-back control. In some embodiments, the control engine 402 can be implemented as a feed-back control with a feed-forward loop. In some embodiments, the control engine 402 can be implemented as a bang-bang control. Many variations are possible.

Figure 5:
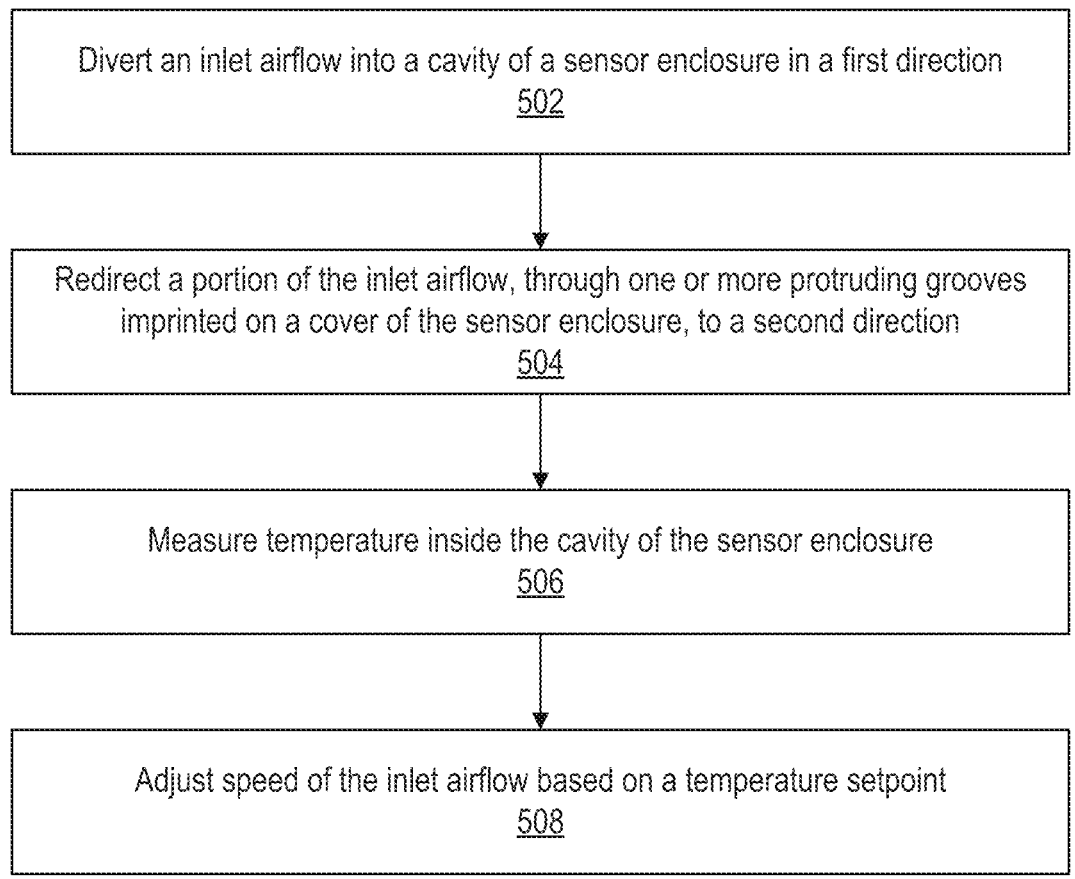
FIG. 5 illustrates an example method, according to an embodiment of the present disclosure.

FIG. 5 illustrates an example method 500, according to an embodiment of the present disclosure. It should be appreciated that there can be additional, fewer, or alternative steps performed in similar or alternative orders, or in parallel, within the scope of the various embodiments unless otherwise stated.

At block 502, the example method 500 can divert an inlet airflow into a cavity of a sensor enclosure in a first direction. At block 504, the example method 500 can redirect a portion of the inlet airflow, through one or more protruding grooves imprinted on a cover of the sensor enclosure, to a second direction. At block 506, the example method 500 can measure temperature inside the cavity of the sensor enclosure. At block 508, the example method 500 can adjust speed of the inlet airflow based on a temperature setpoint.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
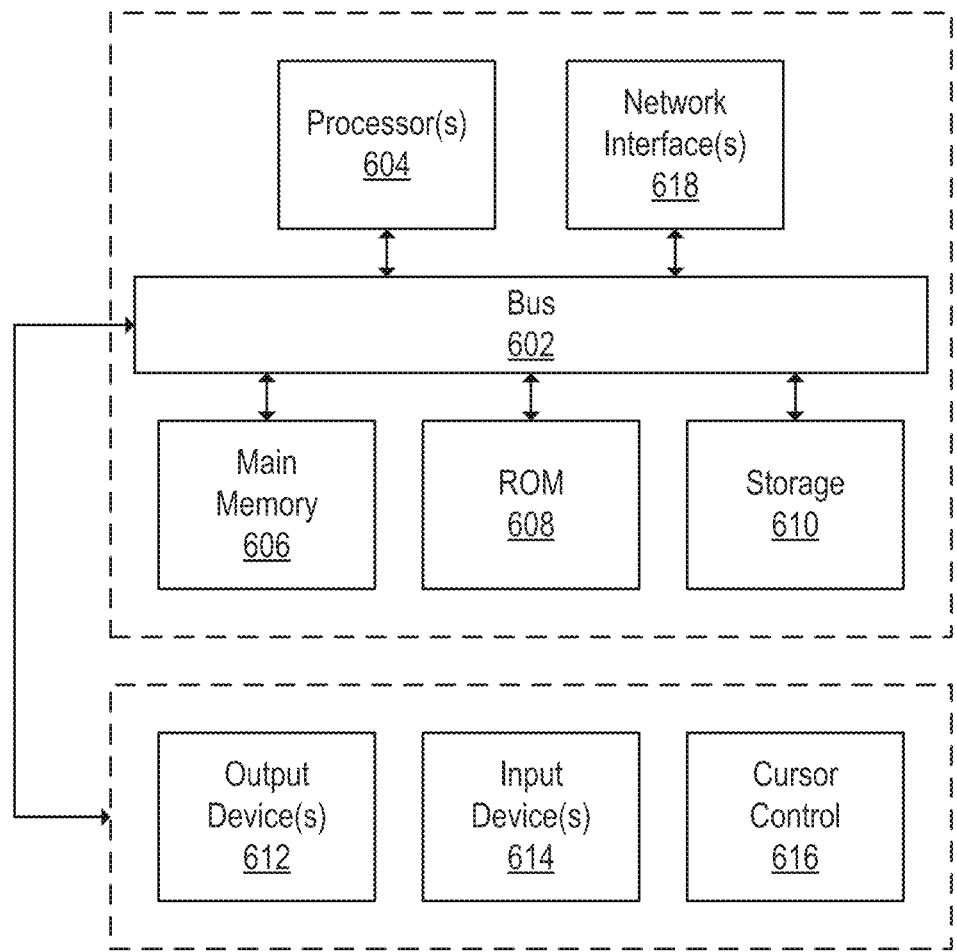
FIG. 6 illustrates a block diagram of a computer system.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A cover defining an outer contour of a sensor enclosure with three portions stacked along a vertical axis, the cover comprising:
a first portion having a circular domed top and a first angle;
a second portion having a first truncated cone shape and a second angle smaller than the first angle, wherein the second portion is disposed underneath the first portion and coupled to a base of the first portion and includes one or more protrusions on an outer surface of the second portion, wherein the one or more protrusions are arranged diagonally and circularize a portion of an inlet airflow drawn into the sensor enclosure;
a third portion having a second truncated cone shape and a third angle larger than the second angle, wherein the third portion is disposed underneath the second portion and coupled to a base of the second portion and a ring for rotating the cover attached to the third portion.

2. The cover of claim 1, wherein:
the first portion has a first base diameter;
the second portion has a second base diameter; and
the third portion has a third base diameter.

3. The cover of claim 2, wherein the first base diameter is smaller than the second base diameter and the second base diameter is smaller than the third base diameter.

4. The cover of claim 1, wherein the first angle ranges from zero to ninety degrees, the second angle ranges from zero and ninety degrees, and the third angle ranges from zero to ninety degrees.

5. The cover of claim 1, wherein the one or more protrusions are at least one of linear, curved, or tapered.

6. The cover of claim 1, wherein the cover is made of material transparent to wavelengths of light receptive to one or more sensors of the sensor enclosure.

7. The cover of claim 6, wherein the material transparent to wavelengths of light comprises at least one of acrylic glass, strengthened glass, or safety glass.

8. The cover of claim 1, wherein the third portion of the cover is coated with a thin-film neutral filter.

9. The cover of claim 8, wherein the thin-film graduated neutral filter alters a transmittance of light through the third portion of the cover.

10. The cover of claim 1, wherein the inlet airflow flows vertically along the vertical axis of the cover.

11. A sensor enclosure comprising:
a cover defining an outer contour of the sensor enclosure with three portions stacked along a vertical axis, wherein the cover comprises:
a first portion having a circular domed top;
a second portion having a first truncated cone shape, wherein the second portion is disposed underneath the first portion and coupled to a base of the first portion and includes one or more protrusions on an outer surface of the second portion, wherein the one or more protrusions are arranged diagonally and circularize a portion of an inlet airflow drawn into the sensor enclosure; and
a third portion having a second truncated cone shape, wherein the third portion is disposed underneath the second portion and coupled to a base of the second portion; and
a structure encased by the cover, the structure comprising:
a frame having an upper plate and a lower plate held in place by one or more structs, the upper plate providing a mounting surface for at least one light detecting and ranging sensor and the lower plate providing a mounting surface for one or more cameras;
a ring disposed peripherally to the frame, the ring operatively coupled to the cover;
a temperature sensor mounted to the lower plate of the frame, wherein the temperature sensor measures temperature inside the sensor enclosure;
a fan to draw the inlet airflow into the sensor enclosure through an air duct from an external source;
a powertrain configured to rotate the ring and the cover coupled to the ring; and
one or more anchoring posts disposed underneath the frame and the ring to anchor the sensor enclosure to a vehicle.

12. The sensor enclosure of claim 11, wherein the powertrain comprises an electric motor coupled to a drivetrain.

13. The sensor enclosure of claim 12, wherein the drivetrain comprises one or more gears.

14. The sensor enclosure of claim 11, wherein the inlet airflow is air conditioned.

15. The sensor enclosure of claim 11, wherein the external source is at least one of a vehicle cabin or an air conditioning unit.

16. A method for operating a sensor enclosure comprising:
diverting, by a fan associated with the sensor enclosure through an air duct, an inlet airflow into a cavity of the sensor enclosure in a first direction;
redirecting, by one or more protrusions of a cover associated with the sensor enclosure, a portion of the inlet airflow to a second direction, wherein the one or more protrusions are arranged diagonally on the cover;
measuring, by a temperature sensor associated with the sensor enclosure, temperature inside the sensor enclosure;
adjusting, by changing a speed of the fan, a speed of the inlet airflow based on the temperature inside the sensor enclosure; and rotating, by a powertrain associated with the sensor enclosure, a ring associated with the sensor enclosure to which the cover is coupled based on the temperature inside the sensor enclosure.

17. The method of claim 16, wherein the first direction is a vertical direction, and wherein the second direction is a circular direction.

18. The cover of claim 1, wherein:
the first portion has a first base diameter;
the second portion has a second base diameter;
the third portion has a third base diameter; and
the cover is rotatable by a powertrain.

19. The cover of claim 18, wherein the first base diameter is smaller than the second base diameter and the second base diameter is smaller than the third base diameter.

20. The cover of claim 1, wherein the one or more protrusions are at least one of linear, curved, or tapered; and
the cover is rotatable by a powertrain.

\* \* \* \* \*